US012683091B2

(12) United States Patent (10) Patent No.: US 12,683,091 B2
Dobai (45) Date of Patent: Jul. 14, 2026

(54) CAPACITOR AND METHOD OF FORMING A CAPACITOR

(71) Applicant: TDK Electronics AG, Munich (DE)

(72) Inventor: László Dobai, Szeleste (HU)

(73) Assignee: TDK Electronics AG, Munich (DE)

( * ) Notice: Subject to any disclaimer, the term of this patent is extended or adjusted under 35 U.S.C. 154(b) by 152 days.

(21) Appl. No.: 18/751,139

(22) Filed: Jun. 21, 2024

(65) Prior Publication Data

US 2025/0385050 A1    Dec. 18, 2025

(30) Foreign Application Priority Data

Jun. 17, 2024    (DE) .......................... 102024116962.1

(51) Int. Cl.
| *H01G 9/12* | (2006.01) |
| *H01G 9/00* | (2006.01) |
| *H01G 9/035* | (2006.01) |
| *H01G 9/045* | (2006.01) |
| *H01G 9/052* | (2006.01) |
| *H01G 9/145* | (2006.01) |

(52) U.S. Cl.
CPC ............. *H01G 9/12* (2013.01); *H01G 9/0029* (2013.01); *H01G 9/035* (2013.01); *H01G 9/045* (2013.01); *H01G 9/052* (2013.01); *H01G 9/145* (2013.01)

(58) Field of Classification Search
CPC ........ H01G 9/12; H01G 9/0029; H01G 9/035; H01G 9/045; H01G 9/052; H01G 9/145
See application file for complete search history.

(56) References Cited

U.S. PATENT DOCUMENTS

| 4,992,910 | A | 2/1991 | Evans |
| 8,760,850 | B2 | 6/2014 | Ellertsen |
| 8,995,112 | B2 | 3/2015 | Schnitter |
| 9,202,634 | B2 | 12/2015 | Taira |
| 9,330,851 | B2 | 5/2016 | Taira |
| 9,378,897 | B2 | 6/2016 | Taira |
| 9,384,901 | B2 | 7/2016 | Weaver |
| 2009/0027557 | A1 | 1/2009 | Berbecel |
| 2009/0046412 | A1 | 2/2009 | Kubota |
| 2009/0185330 | A1 | 7/2009 | Breznova et al. |
| 2011/0038098 | A1 | 2/2011 | Taira |
| 2011/0053764 | A1 | 3/2011 | Taira |
| 2011/0273816 | A1 | 11/2011 | Moriya et al. |
| 2012/0094016 | A1 | 4/2012 | Taira |

(Continued)

FOREIGN PATENT DOCUMENTS

| CN | 101443865 A | 5/2009 |
| CN | 103456490 A | 12/2013 |

(Continued)

OTHER PUBLICATIONS

Translation of JP '644 (Year: 2012).*

(Continued)

*Primary Examiner* — Dion R. Ferguson
(74) *Attorney, Agent, or Firm* — Nixon Peabody LLP

(57) ABSTRACT

A capacitor includes a capacitive element arranged in a housing, wherein in or on the housing a gas dissipation element is arranged and/or wherein the capacitor has an electrolyte that comprises an organic acid having a pka of 4.1 or higher and/or wherein the capacitor has an OMS of 20% or higher.

15 Claims, 5 Drawing Sheets

(56) References Cited

U.S. PATENT DOCUMENTS

| | | | | |
|---|---|---|---|---|
| 2012/0106029 A1* | 5/2012 | Galvagni | ............ | H01G 9/0425 |
| | | | | 29/25.41 |
| 2014/0284514 A1 | 9/2014 | Akazawa | | |
| 2018/0330887 A1 | 11/2018 | Elekes | | |
| 2022/0344104 A1 | 10/2022 | Bosze | | |
| 2024/0282534 A1 | 8/2024 | Kaneko | | |
| 2025/0385050 A1* | 12/2025 | Dobai | ...................... | H01G 9/12 |

FOREIGN PATENT DOCUMENTS

| | | | | | |
|---|---|---|---|---|---|
| CN | 104659371 | A | 5/2015 | | |
| CN | 102009170 | B | 11/2015 | | |
| CN | 102017034 | B | 1/2016 | | |
| CN | 103658660 | B | 8/2017 | | |
| CN | 107316745 | B | 5/2019 | | |
| CN | 211016802 | U | 7/2020 | | |
| CN | 113707460 | A | 11/2021 | | |
| CN | 114724857 | A | 7/2022 | | |
| CN | 116453864 | A | 7/2023 | | |
| CN | 219476506 | U | 8/2023 | | |
| CN | 117373832 | A | 1/2024 | | |
| DE | 102005033476 | A1 | 1/2007 | | |
| DE | 102008043238 | A1 | 7/2009 | | |
| DE | 102015119844 | A1 | 5/2017 | | |
| DE | 102019133565 | A1 | 6/2021 | | |
| DE | 102023110552 | A1 | 10/2024 | | |
| EP | 1210972 | A2 | 6/2002 | | |
| EP | 3115100 | A1 | 1/2017 | | |
| EP | 2202117 | B1 | 12/2018 | | |
| EP | 3089181 | B1 | 6/2023 | | |
| EP | 4290545 | A1 | 12/2023 | | |
| EP | 4310873 | A1 | 1/2024 | | |
| JP | S59125038 | A | 7/1984 | | |
| JP | S60066025 | U | 5/1985 | | |
| JP | 2001015391 | A | 1/2001 | | |
| JP | 2002164262 | A | 6/2002 | | |
| JP | 2003217546 | A | 7/2003 | | |
| JP | 2006125559 | A | 5/2006 | | |
| JP | 2011204724 | A | 10/2011 | | |
| JP | 2011238738 | A | 11/2011 | | |
| JP | 2012069644 | A * | 4/2012 | .............. | H01G 9/12 |
| JP | 2013187089 | A | 9/2013 | | |
| JP | 2014135481 | A | 7/2014 | | |
| JP | 5757867 | B2 | 8/2015 | | |
| JP | 5816839 | B2 | 11/2015 | | |
| JP | 2016076674 | A | 5/2016 | | |
| JP | 6925874 | B2 | 12/2018 | | |
| JP | 2018538687 | A * | 12/2018 | .............. | H01G 9/12 |
| JP | 6513423 | B2 | 5/2019 | | |
| JP | 2019114440 | A | 7/2019 | | |
| JP | 6784965 | B2 | 11/2020 | | |
| JP | 7168823 | B1 | 11/2022 | | |
| KR | 1020180069962 | A | 6/2018 | | |
| WO | 2013054691 | A1 | 4/2013 | | |
| WO | 2023286654 | A1 | 1/2023 | | |
| WO | WO 2023/233610 | A1 | 12/2023 | | |
| WO | WO-2024143420 | A1 * | 7/2024 | ............ | H01G 9/028 |
| WO | WO-2024223387 | A1 * | 10/2024 | .............. | H01G 9/12 |
| WO | WO-2025192529 | A1 * | 9/2025 | .............. | H01G 9/00 |

OTHER PUBLICATIONS

Translation of WO '420 (Year: 2024).*

Examination Report in related Japanese Patent Application No. 2024-101345, dated May 1, 2025, in Japanese (6 pages).

Examination Report in Chinese Patent Application No. 202421649344. 0, dated Sep. 3, 2025, in Chinese (1 page).

* cited by examiner

CAPACITOR AND METHOD OF FORMING A CAPACITOR

CROSS-REFERENCE TO RELATED APPLICATIONS

This application claims the benefit of and priority to Germany Patent Application No. 102024116962.1, filed Jun. 17, 2024, which is incorporated herein by reference in its entirety.

FIELD

The present application concerns a capacitor and a method of forming such a capacitor.

BACKGROUND

There is a high demand for the provision of volume-efficient capacitors. This means that there is a high demand for the capacitance of a capacitor to be increased while maintaining its size or for miniaturizing a capacitor while maintaining its capacitance.

In this context, the inventors of the present invention found that at least some capacitors with high volume efficiency tend to have a reduced lifetime under the same operation conditions as less volume-efficient capacitors.

SUMMARY

Accordingly, it is an aim of the present application to provide a capacitor which can have an improved lifetime. According to another aim a capacitor may be provided that can have improved volume efficiency.

The capacitors of claims 1 to 5 help to at least partially overcome some of the above-stated problems or at least partially help to fulfil at least one of the above-stated aims.

Advantageous embodiments are provided in the dependent claims.

In the following several features are disclosed which, when taken alone, can provide benefits such as those described above or others that will be described below. However, in particular when combined, synergetic effects and additional benefits may be achieved.

According to an embodiment that may apply to all other embodiments in the following, a capacitor is described that has a capacitive element and a housing, in which the capacitive element is arranged.

According to an embodiment, the capacitive element may be configured to store electric charges during operation of the capacitor. For example, the capacitive element can be configured to be charged and discharged during operation of the capacitor. For example, the capacitive element can comprise a cathode and an anode. The cathode and the anode can be electrically contacted by electrically conductive elements, such as wires or leads. The cathode, the anode are not limited in general.

According to an embodiment that may be preferred for the other embodiments, the capacitive element can be a winding element in which the anode and the cathode are wound. For example, the winding element can be a cylindrical winding element or a flattened winding element.

According to an embodiment that may also be preferred for the other embodiments, the capacitor can be an electrolytic capacitor. In this case an electrolyte is arranged between anode and cathode. For example a separator that is drenched with or soaked with the electrolyte may be arranged between anode and cathode. The separator is not limited except it should be configured to be soaked with or drenched in an electrolyte and it should not be electrically conductive. The separator may comprise or consist of a cellulose-based material such as paper. In an electrolytic capacitor it may be preferred that the anode has an oxide on its surface that provides an at least partial chemical and electrical separation between anode and electrolyte. The electrolyte may have a water content of at least 2 wt %.

It is preferred for the electrolytic capacitor to have a winding element as described above. In particular, the winding element may comprise cathode and anode foils that are wound around each other and that are separated by a an electrolyte-drenched separator. For example, the capacitor is an aluminum electrolytic capacitor. The winding element is partially or fully immersed in the liquid electrolyte, for example.

Generally, the anode and the cathode are not limited. The anode, according to an embodiment, may be an etched anode comprising or consisting of aluminum.

According to an embodiment that is generally preferred for the embodiments and in particular for the winding element and/or the electrolytic capacitor embodiment, the anode can be a so-called sintered anode. Here and in the following, the term sintered anode addresses any anode that comprises a sintered portion.

The sintered anode, according to an embodiment, can comprise a valve metal. Preferably, the sintered portion comprises one or more valve metals. In this case, in the sintered portion one or more different types of valve metal particles have been sintered together.

The inventors of the present invention have found that sintered anodes may help to increase the volume efficiency of the capacitor. In particular when compared to etched electrodes, an improved volume efficiency can be found.

Valve metals are understood in the general technical sense and are not limited. For example, valve metals at least include aluminum, titanium, tantalum, niobium, tungsten, chromium, zirconium, hafnium, zinc, vanadium, bismuth or antimony. Of these in particular aluminum, tantalum and vanadium are preferred. Most preferred is aluminum.

According to an embodiment, the anode can be a sintered bulk anode, i.e. in this case the majority of the volume of the anode may consist of the sintered material. In this case a sintered material block can be contacted by a lead terminal or similar.

According to an embodiment that is even more preferred with the other embodiments in here, the sintered anode may have a substrate besides the sintered portion. This substrate portion comprises a conductive material. In this case, the sintered portion can be arranged on a main surface of the substrate. For example and as preferred, the substrate can be a foil and the sintered portion can be a sintered layer that is arranged on a main surface of said foil. Even more preferred, two opposing main surfaces of the substrate foil can be covered by a sintered layer. Such a setup may allow for a 15 to 30% higher specific capacitance to be reached compared to an etched anode.

According to an embodiment, the anode, in both cases of an etched or sintered anode, has a passivation layer on its surface. This passivation layer can be an oxide layer.

According to an embodiment which may be preferred but not limited to sintered anodes, an average thickness of the anode can be at least 80 µm. The inventors have found that this average thickness helps to provide anodes with improved mechanical stability, which makes handling and manufacturing easier.

The housing of the capacitor can house the capacitive element. For example and preferably, it is configured to mechanically stabilize the capacitor and/or protect the capacitive element from external forces or harmful substances that might damage the capacitor during operation.

According to an embodiment, the housing can comprise a casing and a cover that closes the casing. For example, the casing is configured to mechanically stabilize the capacitor. In particular, the casing comprises a cavity where the capacitive element is arranged. For example, the casing can have an opening for inserting the capacitive element into the cavity during production of the capacitor. The shape of the casing is not limited. For example, the casing may have a cylindrical form with a bottom surface and an open end side facing opposite to the bottom surface, wherein the open end side forms the opening. In particular, the casing may be configured to protect the capacitive element from external forces or harmful substances that might damage the capacitor during operation.

The casing can be configured to electrically insulate the capacitive element from the environment outside the casing. Alternatively, the casing can be configured for electrically contacting the capacitive element. For example, the casing is electrically conductive and is electrically connected to the anode or the cathode. Moreover, the casing can be configured as a heat sink, such that heat generated by the capacitive element during operation is efficiently transferred and dissipated away from the capacitive element. For example, the capacitive element is in thermal contact with the casing. For example, the casing can comprise or consist of a metal, such as aluminum. Alternatively or in addition, the casing can comprise or consist of a plastic or a polymer, for example.

For example, the cover and the casing form a sealed cavity, in which the capacitive element is arranged. In particular, the cavity is sealed by arranging or mounting the cover on the opening of the casing. Moreover, at least one electrically conductive element, such as a wire or lead, for electrically contacting the capacitive element can be arranged in the cover or integrated into the cover. For example, the cover comprises or consists of a metal, a plastic, a glass, a hard paper, or rubber.

The inventors of the present invention have found that in housed capacitors and in particular in electrolytic capacitors, gas can form during manufacturing or during operation. This gas evolution can increase the pressure inside a capacitor, which can hinder the operation of the capacitor or destroy the capacitor and thus affect the lifetime of the capacitor. This effect is particularly pronounced for capacitors with high volume efficiency in general, as here electrically unused volumes may be avoided which could compensate for the gas evolution. However, for capacitors with sintered anodes, the effect is particularly pronounced. For example, during charging or discharging of the capacitor, electrochemical processes can generate gases, such as $H_2$, $CO_2$, methane, ethane or other low-molecular-weight gases, inside the capacitor. Consequently, the pressure inside the capacitor can increase during operation. If the pressure inside the capacitor becomes too large, the capacitor can be damaged or break, for example.

The inventors of the present invention think that sintered anodes are particularly prone to forming cracks in or on the sintered body. The inventors think that such cracks may be formed due to mechanical stress, for example during production, such as winding of a winding element. This may lead to macroscopic cracks. In addition, thermal stress, for example due to temperature changes, may also form cracks. The inventors observed that sintered anodes seem to be more sensitive to thermal stress. Also freezing and thawing of an electrolyte may cause additional cracks.

The inventors observed that increased gas formation might somehow relate to the above-described cracks. The inventors have the theory that the cracks are reactive areas in which, for example due to chemical reactions, gas can form. The inventors think that without voltage applied but also during operation under voltage, chemical or electrochemical processes produce gas at the crack sites. Also, the cracks seem to increase the leakage current, which also may cause gas formation. Also, the presence of cracks seems to make electrodes more sensitive to water-containing electrolytes.

According to an embodiment, a gas dissipation element is arranged in or on the housing. The gas dissipation element is configured for reducing a gas pressure inside the capacitor. For the above-mentioned reasons, having a gas dissipation element is particularly useful in capacitors with high volume efficiency in general but particularly in capacitors having a sintered anode. The gas dissipation element may be configured to reduce a gas pressure inside the capacitor as soon as it is sealed or otherwise airtight. This can be after a sealing step during production, such as in the above example when closing the casing with the cover. Even more relevantly the gas dissipation element may be configured to reduce a gas pressure inside the capacitor during operation.

It is highly preferred that under usual operation conditions the gas dissipation element is configured to reduce the gas pressure in a non-destructive manner in contrast to a destructive burst-open pressure relief system.

In particular, gas can be generated during operation of the capacitor inside the housing. This gas can escape from the housing via the gas dissipation element. For example, if a partial pressure of the gas inside the cavity is larger than the partial pressure of the gas outside the cavity, the gas can diffuse or permeate out of the housing through the gas dissipation element. The gas dissipation element can preferably be configured such that liquids such as electrolytes cannot permeate or diffuse through the gas dissipation element as easily as gases. More preferably, the gas dissipation element is configured such that over a technically relevant period of time no electrolyte can permeate through it. In other words, in this case liquids can be hermetically sealed inside the housing, for example.

According to a modification of the prior embodiment, the gas dissipation element can be placed in or above a through hole in the housing. The through hole may be established in a wall of the housing. Here and in the entire application the term "wall" is not limited to a side wall but can also be a bottom or top wall. Generally, the position of said through hole, and accordingly of said gas dissipation element, is not limited.

Also, more than one gas dissipation element may realized in this manner in one capacitor. Generally a through hole can be any type of opening that forms a connection between the inside of the housing and the outside. In particular the through hole can be a hole or opening that fully penetrates the housing. The through hole can have any shape.

According to an embodiment, if a capacitor has a winding element it may be preferred that the gas dissipation element is arranged on a side of the housing that faces the top or bottom side of a winding element. The top or bottom side of a winding element can be understood as the side that exposes the rim of the wound foils. In this configuration the gas formed in the coil can exit the coil towards said rim of the wound foils and can efficiently exit the housing through the gas dissipation element.

According to an embodiment, if the gas dissipation element is placed in a through hole in the housing, a portion of the gas dissipation element protrudes into said opening. This can have the advantage that it can be easier to anchor the gas dissipation in the housing in a mechanically stable manner.

In this case, according to an embodiment, a portion of the gas dissipation element may protrude out of said opening and either on the inside, but more preferably in this case on the outside, protrude beyond a surface level of said inner or outer surface of the housing.

According to a preferred embodiment, the gas dissipation element can be flush with the housing on at least the inside or the outside of the housing. More preferably the gas dissipation element can be flush with both inside and outside of the housing. Being flush with the inside of the housing has the advantage that the gas dissipation element does not reduce the internal volume of the housing. This unoccupied internal volume can be filled by the winding element, thus increasing the volume efficiency, or can act as a buffer volume to reduce the impact of generated gas. Being flush with the outside of the housing may simplify the external profile of the capacitor, which makes it easier incorporate it into applications. Furthermore, this may help to avoid protruding portions on the outside of the housing that could, for example during mounting of the capacitor, get caught by sharp or protruding external objects which may damage the housing or the gas dissipation element.

According to an embodiment, if the gas dissipation element is placed above a through hole in the housing, this can mean that there is a portion of the gas dissipation element that is not arranged inside the through hole. In this case, this portion of the gas dissipation element can be arranged on an outer surface or on an inner surface of the casing or the cover and above the through hole.

Here and in other parts of this text, the inner surface is a surface facing the capacitive element, whereas the outer surface is a surface opposite to the inner surface. In particular, neither the outer surface nor the inner surface comprises a sidewall of the through hole.

In particular in the previous embodiment, the gas dissipation element may partially or preferably completely cover the through hole. In a similar manner the gas dissipation element can cover a number of through holes which are in proximity to each in the housing. For example, the gas dissipation element may cover the one, two, or more through holes or any plurality of through holes. For example, the gas dissipation element may completely cover an array of through holes. For example, the gas dissipation element may be arranged or disposed directly on or above the at least one through hole.

According to an embodiment, a contact surface of the wall of the housing comprises a surface structuring that is configured to improve the bonding between a portion of the gas dissipation element that is in contact with the contact surface and said contact surface. In this case the gas dissipation element is chemisorbed onto the housing. This mode of adhering or bonding the gas dissipation element into or onto the housing is advantageous as a mechanically stable connection can be formed.

According to an embodiment of the gas dissipation element being at least partially arranged inside the through hole, a part of or all of the surface structuring can be established on a surface portion of the through hole, i.e. a wall of the through hole which is inside the wall of the housing. According to an embodiment, it can be preferred that an entire inner circumference of the through hole has the surface structuring. This can but does not necessarily mean that the entire surface of the through hole has the surface structuring, but means that preferably at least a closed loop-like area of the inner surface of the through hole has the surface structuring. This may help to ensure a complete sealing of the through hole.

According to an embodiment, the through hole can have a stepped structure with at least one step. By having a stepped structure, the surface area of the structured contact surface of the through hole can be increased.

According to an embodiment of the gas dissipation element in which the gas dissipation element is placed above a through hole, the surface structuring can be established on the inner or outer surface of the housing. For example, in this case the surface structuring may completely enclose the through hole. For example, the surface structuring comprises a region of the surface with an increased surface roughness. For example, the surface structuring comprises or consists of one or more recessed portions. In particular, the recess may completely surround the through hole, or the through hole may be formed inside the recess. For example, a depth of the recess is at most one half of a thickness of the casing or the cover.

According to another embodiment of the capacitor, the gas dissipation element can be chemisorbed to the housing. For example, in this case no adhesive is used to attach the gas dissipation element to the housing. In particular, direct chemical bonds may be formed between the gas dissipation element and the housing, such that a liquid-tight seal is formed. The chemical bonds can, for example, be primary bonds, such as covalent bonds, ionic bonds or metallic bonds, or secondary bonds such as dipole-dipole interactions, hydrogen bonds or van-der-Waals bonds.

Having a chemisorbed gas dissipation element compared to a gas dissipation element that is mechanically clamped inside the through hole, for example, means that the production process can be simplified by arranging the gas dissipation element such that it seals the through hole, thereby reducing production costs. Moreover, a total thickness of the housing and the gas dissipation element may be advantageously reduced, as no elements for clamping the gas dissipation element may be necessary, for example.

According to an embodiment of the capacitor, the gas dissipation element can comprise or consist of a gas diffusive layer. In particular, gases generated inside the capacitor during operation can diffuse or permeate through the gas diffusive layer or imbue the gas diffusive layer. A gas permeability for $H_2$ of the gas dissipation element is preferably between $10^{10}$ cm$^2$/(s×atm) and $10^{13}$ cm$^2$/(s×atm), for example.

According to a further embodiment of the capacitor, the gas dissipation element can comprise or consist of at least one of the following materials: a polymer, a metal organic framework, or silicon. For example, the gas dissipation element comprises or consists of a gas diffusive layer, wherein the latter comprises or consists of a polymer, a silicone, a metal organic framework, silicon, silicon nitride, or silicon carbide, for example.

According to a further embodiment of the capacitor, a thickness of the gas dissipation element can be between 0.1 mm and 2.5 mm, inclusive. The thickness of the gas dissipation element can also be between 0.1 mm and 3 mm, inclusive. For example, a thickness of the gas diffusive layer is between 0.1 mm and 2.5 mm, inclusive. In particular, the thickness refers to a spatial dimension in a direction parallel to the through hole. In other words, the thickness refers to a spatial dimension in a direction parallel to a central axis of the through hole.

According to a further embodiment of the capacitor, a total thickness of the wall of the housing and the gas dissipation element can be at most 2.5 mm. In particular, the total thickness may refer to a combined thickness of the gas dissipation element and the housing. This is particularly preferred when the through hole is established in the casing.

According to a further embodiment of the capacitor, a total thickness of the housing and the gas dissipation element can be at most 3.5 mm. In particular, the total thickness may refer to a combined thickness of the gas dissipation element and the cover. This is particularly preferred when the through hole is established in the casing.

According to a further embodiment, the gas dissipation element is configured to allow molecules with a molecular weight below 60 Da (unit: Dalton; equals atomic mass in u) to penetrate it. In particular, $H_2$ can penetrate or permeate through the gas dissipation element.

According to another embodiment, the gas dissipation element can have an active portion configured for reducing gas pressure inside the capacitor and a passive portion that is configured to provide a mechanical connection between the housing and the active portion. This can simplify manufacturing or mounting of the gas dissipation element, as the functionality of establishing a contact or connection with the housing is separated from the functionality of allowing gas to diffuse or permeate out of the housing. What was said above about the gas dissipation element can apply to the active portion in the same way, as far as applicable. In particular the active portion may comprise the materials defined for the gas dissipation element above. The passive portion can comprise or consist of silicone resin, acrylate resin, urethane resin, synthetic rubbers, natural rubbers, latex, fluorinated polymers. Yet in a generalized manner the active portion is not necessarily made with or of a different material than the passive portion. In the most general sense, active portion and passive portion just refer to the above described functionalities. These may be realized by different materials or by constriction based or geometric means of different portions.

According to an embodiment, the active portion of the gas dissipation element can have a cylindrical form. This form can be advantageous to manufacture.

According to an embodiment, the active portion of the gas dissipation element can be configured to irreversibly rupture or irreversibly disconnect from the passive portion upon a pressure increase which cannot be compensated by the non-destructive pressure reduction capabilities of the gas dissipation element. This has the advantage that the thus constructed gas dissipation element is capable of non-destructively reducing the pressure and if there is a sudden increase in pressure that cannot be compensated by the above described diffusion or permeation based mechanism, it can also burst and prevent a high buildup of pressure that may destroy not only the capacitor but also further components in a setup in which the capacitor is built or which may otherwise be dangerous. Thus, the gas dissipation element constructed in this way can supplement or even replace the function of a separate emergency pressure release system.

According to another embodiment, a portion of silicon (elemental symbol Si) in the gas dissipation element can be 5 wt % or higher. Similarly, in case of the gas dissipation element having an active and passive portion, a portion of silicon in in the active portion can be 5 wt % or higher. The inventors of the present invention found that in case that the gas dissipation element or the active portion has a portion of silicon of above 5 wt %, the dissipation of the gas can be increased and pressure can be reduced faster. This can be particularly relevant for the active and passive portion, as here the active volume is reduced compared to the case in which the entire gas dissipation element has active properties. This reduced active volume can be at least partially compensated by having said amount of silicon.

According to an embodiment, the active volume of the gas dissipation element or the volume of an active portion of the gas dissipation element can be 0.05 mm$^3$ or higher. The inventors surprisingly found that with said active volume the evolved gas can be efficiently transported out of the housing. More preferably an active volume is 0.055 mm$^3$ or higher or even 0.058 mm$^3$ or higher. This even improves the above described advantage.

According to an embodiment that may be combined with any of the embodiments having a gas dissipation element but that is not limited thereto, at least a portion of the capacitive element is soaked with or immersed in an electrolyte. Furthermore, the electrolyte comprises an organic acid having a pka of 4.1 or higher. Here an organic acid can be any acid that is considered to be an organic molecule in the general chemical understanding. The organic acid may in particular be an organic Brønsted acid. "pka of 4.1 or higher" can be understood as the acid having a proton that has a pka of 4.1 or a less acidic proton. Of course, the statement "the electrolyte comprises an organic acid having a pKa of 4.1 or higher" can mean that the electrolyte comprises one or more organic acids having a pa of 4.1 or higher. The inventors found that also a pka of 4.2 or higher, of 4.3 or higher, of 4.4 or higher or 4.5 or higher can be a good help in suppressing gas evolution.

The inventors of the present invention have found that having an organic acid with a pka of 4.1 or higher helps to reduce leakage current and gas evolution rate. This is particularly relevant for sintered anodes, in particular aluminum-containing sintered anodes. This may also be particularly advantageous for other aluminum-containing anodes. This approach can synergetically complement the above-described embodiments that have a gas dissipation element. The inventors think that the organic acid may help to passivate cracks. The inventors think that the acid helps to form an oxide on the bare metal of the cracks. Furthermore, the inventors think that by having a pka of 4.1 or higher, the acid is not too aggressively acidic and is not likely to cause unwanted side reactions. The inventors think that, with a pka of 4.1 or higher, the acid is too weak to dissolve the metal of the electrode, yet strong enough to passivate cracks.

Concerning the mechanism, the inventors think that acids with low pka values easily become ionic by deprotonation and cause a high ionic density on the surface. They think that this may lead to side reactions and possible breakdown of the oxide when the applied voltage is increasing. On the other hand, acids with higher pKa values are creating crystalline oxide layer which has low leakage current and high dielectric strength.

According to an embodiment, the organic acid preferably has a pka range of $4.1 \leq pKa \leq 5.5$. The inventors have found that an upper limit of 5.5 helps to more efficiently reduce gas evolution compared to a pka of above 5.5. The inventors think that an acid falling within the here-defined pka range has an acidity that is, advantageously not too acidic and not too weak, i.e. an upper limit of 5.5 helps in that the acid is more likely to be strong enough to help to passivate cracks. The inventors found that the suppression of the gas evolution can be reduced even better in the case of an upper pka limit of 5.2, 5.1 or 5.0.

According to an embodiment, the organic acid can be a carboxylic acid in which the carboxylic acid proton has a pka of 4.1 or higher or falls into the above described pKa range. The inventors found that carboxylic acids can provide the above properties and are unlikely to cause unwanted side reactions.

According to an embodiment, the organic acid can be an at least dicarboxylic acid having a $pKa_1$ of 4.1 or higher. The term "at least dicarboxylic acid" includes all solely dicarboxylic acids and carboxylic acids with a higher number of carboxyl groups. The latter can be addressed as polycarboxylic acids. "$pKa_1$" addresses the pka value of the first deprotonation in a titration with a base. The above described properties may apply for the $pKa_1$ al, such as in particular the embodiment concerning the range.

According to an embodiment, linear dicarboxylic acids may be used in which a number of carbon atoms with any substituent is arranged between the acid groups. For example and preferred, the groups between the acid groups can be methylene groups ($-CH_2-$). For example the dicarboxylic acid can have the structure $HOOC-(CH_2)_n-COOH$. n can in principle be any natural number including 0. More preferred n is larger or equal to 4. The inventors found that having at least 4 methylene groups between the carboxylic groups may help the second proton to also remain sufficiently acidic to support suppression of gas evolution. For example, dicarboxylic acids are not limited to, but may be adipic acid, suberic acid, azelaic acid, sebacic acid, undecandioic acid, dodecandioic acid, brassylic acid. The $pKa_1$ values of these may be used to substitute the above given range.

According to an embodiment, esters of at least dicarboxylic acids can be used in which one carboxylic acid group remains. The above-defined pka-value may also apply to these. For example, the esters of the above listed dicarboxylic acids may be used.

According to other embodiments, dimer acids, i.e. polymerized unsaturated fatty acids or trimer acids, i.e. polymerized unsaturated fatty acids may be used. The above-defined pka-value may also apply to these.

According to an embodiment, the concentration of the organic acid can be at least 0.1 wt. This can mean that the concentration of one organic acid having a pka of 4.1 or higher is at least 0.1 wt %. This can also mean that the concentration of all organic acids present in the electrolyte that have a pKa of 4.1 or higher is at least 0.1 wt. The latter is preferred. This concentration range is particularly preferred for the carboxylic acids and even more preferred for at least the dicarboxylic acid or the above-described esters. The inventors have found that a concentration of 0.1 wt % or higher helps to improve suppression of gas evolution. The inventors think that this concentration helps to efficiently oxidize cracks.

According to an embodiment, an upper limit of a concentration range of at least the dicarboxylic acid can be 12 wt %. The above-described advantages are observed in a range of 0.1 wt % to 12 wt % and negative effects are less likely.

According to an embodiment, the electrolyte can comprise a polyol. Even more preferred, a main component of the electrolyte is a polyol. The inventors found that by having a polyol in the electrolyte, the gas evolution suppressive effect of the acid as described above can be particularly preferential. A preferred example of a polyol is ethylene glycol.

According to another embodiment, a further capacitor comprising a capacitive element arranged in a housing is described. In this capacitor, the fraction of the volume occupied by an anode with respect to the total volume inside the housing is 20% or higher. This volume-portion can be addressed as occupied anode metal space, abbreviated to "OMS". The inventors found that volume efficiency can be increased by having an OMS of 20% or higher.

This advantage can be combined with the other embodiments described here in a synergistic manner. However the inventors found that having an OMS of above 20% may affect the lifetime of a capacitor. The inventors speculate that having an OMS of above 20% may reduce a buffer volume that could compensate for gas evolution. Therefore in this case it may be advantageous to apply the above named measures to improve the lifetime of the capacitor.

The inventors have found that in some cases in which an OMS is above 20% a maximum lifetime of the capacitor at 105° C. may be limited to 2000 hours. The above described means may help to achieve a longer capacitor lifetime. In certain applications which require a minimum lifetime of above 2000 hours for example, this may allow capacitors to be employed that have an OMS of above 20%.

According to a further embodiment, a method for producing a capacitor is provided. The above described capacitor can be manufactured by the method. The above described properties and advantages may apply. The method comprises providing a housing. The above described properties of the housing may apply. The housing has a through hole. In this context this opening can be addressed as a first opening. The housing here comprises a casing and a cover.

Furthermore, the method includes arranging a gas dissipation element in or above the through hole or first opening. This can have the above-described properties. The gas dissipation element is chemisorbed onto a contact surface of the housing. Said contact surface comprises a surface structuring that is configured to improve bonding of the housing with the gas dissipation element. As a further step, the capacitive element having an anode that comprises a sintered valve metal is arranged in the casing. Furthermore, before or after arranging the capacitive element in the housing, the capacitive element is impregnated with or soaked in an electrolyte. The capacitive element is enclosed in the housing by placing the cover on a cover-opening in the casing. Said cover-opening may be a second opening configured to be closed by the cover.

According to an embodiment of the method, the step of arranging the gas dissipation element in or above the through hole or first opening can comprise gluing the gas dissipation element housing. For example, an adhesive may be used to glue the gas dissipation element to the housing.

According to a further embodiment of the method that may be applied in addition or instead of the prior embodiment, the step of arranging the gas dissipation element in or above the through hole or first opening can comprise directly bonding the gas dissipation element to the housing. In particular, here no adhesive is used to form a liquid-tight seal between the housing and the gas dissipation element. For example, a primary, secondary or van-der-Waals bond is formed between the gas dissipation element and the case or between the gas dissipation element and the cover.

According to a further embodiment of the method, the gas dissipation element may be chemisorbed to the housing during the step of arranging the gas dissipation element in or above the through hole or first opening. In particular, in this case a chemical reaction can bond the gas diffusive element to the housing.

According to a further embodiment of the method, the step of arranging the gas dissipation element in or above the through hole or first opening can comprise disposing the gas dissipation element in or above the through hole or first opening in a viscous form and subsequently curing or hardening the gas dissipation element. For example, in this case the gas dissipation element can comprise a gas diffusive unit, such as a layer that comprises a resin. For example, the resin is applied and subsequently cured using heat or ultraviolet radiation.

BRIEF DESCRIPTION OF THE DRAWINGS

Further advantageous embodiments and further embodiments of the capacitor and the method for producing a capacitor may become apparent from the following exemplary embodiments described in connection with the figures. However, the invention is not limited to said exemplary embodiments. Further, said embodiments are at least partly depicted in figures showing schematic drawings. These schematic drawings are not true to scale and absolute as well as relative dimensions can be depicted in a distorted manner. Rather, individual elements may be shown exaggeratedly large for better representability and/or better understanding. Accordingly, no absolute or relative dimensions can be taken from the schematic depictions unless otherwise indicated. Elements that are identical, similar, or have the same effect, are denoted by the same reference signs in the figures.

DETAILED DESCRIPTION

Figure 1:
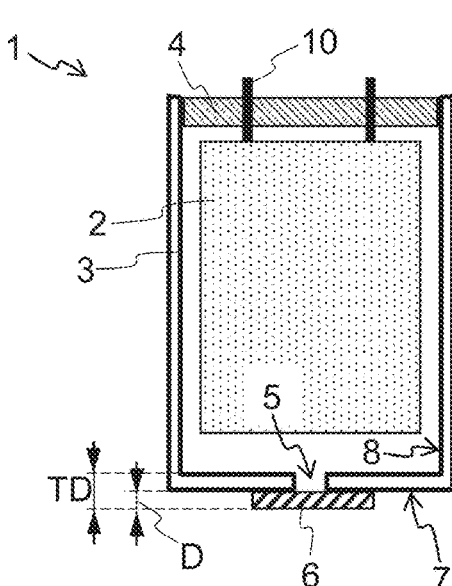
FIG. 1 shows a schematic cross-section of a first exemplary embodiment of a capacitor.

The capacitor 1 according to the first exemplary embodiment shown in FIG. 1 comprises a capacitive element 2 arranged in a housing that is made up by a casing 3 that is sealed with a cover 4. The casing 3 has a cylindrical shape and consists of a metal, such as aluminium. The cover 4 consists of rubber, for example. Moreover, two electrically conductive elements 10 for electrically contacting the capacitive element 2 are embedded into the cover 4.

The capacitor 1 shown here is an electrolytic capacitor. The capacitive element 2 is a winding element in which an anode, a cathode and a separator are wound into a coil. The anode is a sintered anode which has a layer of sintered aluminum particles on both sides of an aluminum foil substrate. The sintered anode can provide improved specific capacitance compared to etched foils.

Though not depicted explicitly, the winding element is wound such that the flat surfaces face the cylindrical side wall of the casing 3 and the rims of the wound foils face the bottom of the casing 3 and the cover 4. This allows gases to more easily migrate towards said bottom or the cover as the flat surfaces of the wound foils cannot block the gas migration.

The electrolyte has ethylene glycol as a main constituent. Furthermore a dicarboxylic acid with pka of between 4.1 and 5.0, such as adipic acid, suberic acid, azelaic acid, sebacic acid, undecandioic acid, dodecandioic acid, brassylic acid, was contained in the electrolyte. The total concentration of all dicarboxylic acids fulfilling $4.1 \leq pKa_1 \leq 5.0$ was 0.1 to 12 wt %.

The casing 3 has a through hole 5 in a bottom surface opposite to the cover 4. The through hole 5 penetrates the cover. The through hole 5 has a circular shape with a diameter between 1 mm and 5 mm. The through hole 5 is covered with a gas dissipation element 6 that is configured for reducing gas pressure inside the capacitor 1 during operation. In particular, a gas such as $H_2$, that is generated by electrochemical processes during charging or discharging the capacitive element 2 during operation of the capacitor 1, can escape from inside the capacitor 1 via the through hole 5 and the gas dissipation element 6. As the through hole 5 and the gas dissipation element 6 are arranged in the bottom of the casing 3, the gas can easily migrate towards the gas dissipation element due to the orientation of the winding element and said bottom with respect to each other, as described above.

The occupied anode metal space (abbreviated to "OMS"; fraction of the volume occupied by the anode with respect to the total volume inside the housing) is 20% or higher. Thus a preferable volume efficiency is realized.

In this first exemplary embodiment, the gas dissipation element 6 is a gas diffusive layer 6 consisting of a silicone, for example. The gas dissipation element 6 is chemisorbed onto an outer surface 7 of the casing 3. The portion to which a chemisorption is established is surface structured by roughening this portion. The outer surface 7 of the casing 3 is opposite to an inner surface 8 of the casing 3, wherein the inner surface 8 faces the capacitive element 2. In particular, the gas dissipation element 6 is not clamped inside the through hole 5, for example. Since no mechanical elements for clamping the gas dissipation element 6 are required, a total thickness TD of the casing 3 and the gas dissipation element 6 can be advantageously reduced. In particular, the total thickness TD of the casing 3 and the gas dissipation element 6 is at most 2.5 mm, whereas a thickness D of the gas dissipation element 6 is between 0.1 mm and 2.5 mm. The volume of the gas dissipation element 6 is 0.058 mm³ or higher.

The arrangement of the gas dissipation element 6 outside the housing allows to have free inner volume inside the housing that may be used for either increasing the winding element and thus the volume efficiency, or can be used as a buffer volume that can compensate for gas formation in addition to the compensation properties of the gas dissipation element 6.

Figure 2:
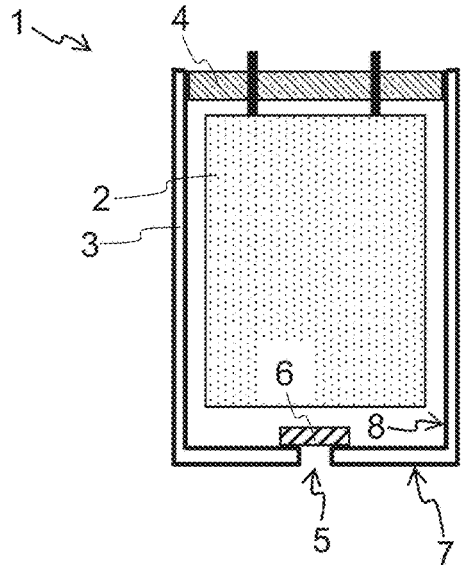
FIG. 2 shows a schematic cross-section of a second exemplary embodiment of a capacitor.

The second exemplary embodiment shown in FIG. 2 is identical to the first exemplary embodiment except for the following differences. Compared to the first exemplary embodiment, the capacitor 1 of the second exemplary embodiment in FIG. 2 comprises a gas dissipation element 6 that is arranged on an inner surface 8 of the casing 3. By arranging the gas dissipation element 6 on the inner surface 8 of the casing 3, the probability of de-bonding or de-lamination of the casing 3 and the gas dissipation element 6 during operation of the capacitor 1 may be reduced, for example.

Figure 3:
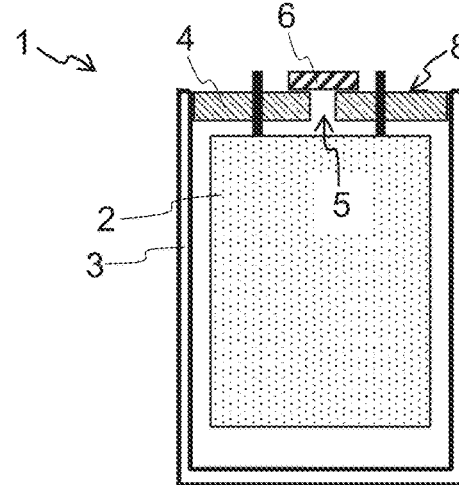
FIG. 3 shows a schematic cross-section of a third exemplary embodiment of a capacitor.

The third exemplary embodiment shown in FIG. 3 is identical to the first exemplary embodiment except for the following differences. Compared to the first exemplary embodiment, the capacitor 1 of the third exemplary embodiment in FIG. 3 has a through hole 5 arranged in the cover 4, rather than in the casing 3. The gas dissipation element 6 is bonded onto an outer surface 8 of the cover 4 that is facing away from the capacitive element 2. Also this orientation allows for easy migration of formed gases towards the dissipation element 6.

Figure 4:
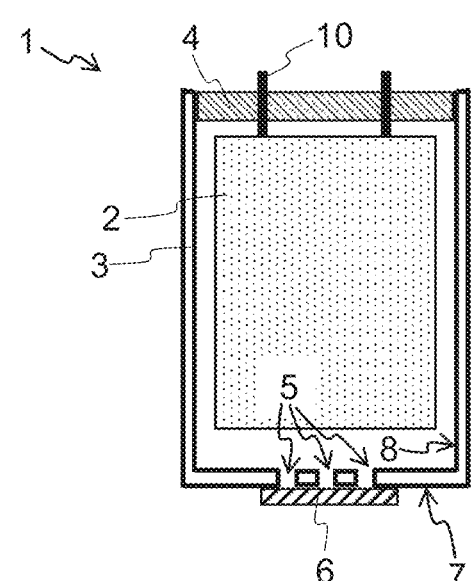
FIG. 4 shows a schematic cross-section of a fourth exemplary embodiment of a capacitor.

The fourth exemplary embodiment shown in FIG. 4 is identical to the first exemplary embodiment except for the following differences. Compared to the first exemplary embodiment, the capacitor 1 according to the fourth exemplary embodiment in FIG. 4 has a plurality of through holes 5 arranged in the bottom surface of the casing 3. The plurality of through holes 5 is arranged in the form of a regular array. The plurality of through holes 5 is completely covered by the gas dissipation element 6.

By arranging a plurality of through holes 5 in the casing 3, a cross-sectional area of each of the plurality of through holes 5 can be reduced compared to a single through hole 5, while an overall gas permeability of the plurality of through holes 5 can be maintained. In particular, by arranging a plurality of through holes 5 instead of a larger, single through hole 5 in the casing, the mechanical stability of the casing 3 can be advantageously increased.

Figure 5:
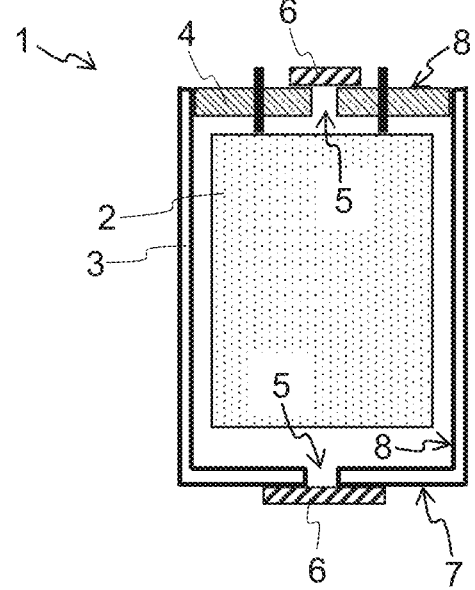
FIG. 5 shows a schematic cross-section of a fifth exemplary embodiment of a capacitor.

The fifth exemplary embodiment shown in FIG. 5 has combined properties of the first and the third exemplary embodiments. Compared to the capacitor 1 described with regard to the exemplary embodiment of FIG. 1, the capacitor 1 according to the exemplary embodiment in FIG. 5 has an additional through hole 5 arranged in the cover 4 that is fully covered by a second gas diffusive element 6.

Figures 6, 7:
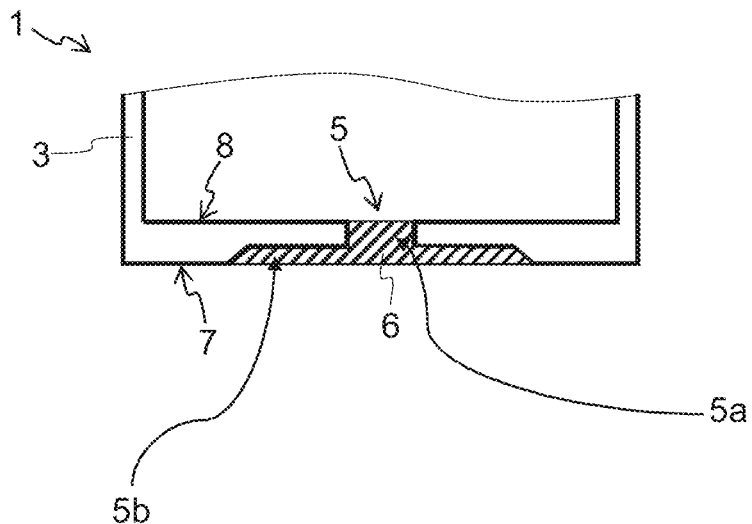
FIG. 6 shows a schematic cross-section the lower portion of a sixth exemplary embodiment of a capacitor.
FIG. 7 shows a schematic cross-section the lower portion of a seventh exemplary embodiment of a capacitor.

FIG. 6 shows a lower portion of a sixth exemplary embodiment. This can replace the lower portion in any of the above described exemplary embodiments. Here the gas dissipation element 6 is arranged fully inside the through hole 5. In addition the through hole 5 has a stepped profile. This is achieved by having a first through hole portion 5a and a second through hole portion 5b. The first through hole portion is a cylindrical hole with the dimensions defined above for the through hole according to the first exemplary embodiment. The second through hole portion 5b is a kind of recess that has a broader diameter than the first through hole portion 5a. As depicted, the second through hole portion can have tapered edges, which is however not necessary within this embodiment. The second through hole portion 5b is a centrosymmetric section of a cone and is oriented centrosymmetrically with respect to the cylindrical first through hole portion 5a. The second through hole portion 5b can also have a cylindrical profile. This stepped profile can be considered as a type of surface structuring.

The gas dissipation element has a complementary shape to the through hole 5 and is fully arranged inside it. It is flush with both the inner surface 8 and the outer surface 7 of the cover 3. This has the advantage of an as large as possible inner volume and no protruding edges on the outside of the housing.

At least the horizontal surface of the recess-like second through hole portion can have a surface structuring by roughening. The gas dissipation element can be chemisorbed into the through hole and in particular to the horizontal surfaces of the through hole in the second through hole portion 5b.

This configuration can of course also replace a setup as shown in FIG. 3 or 5, where the gas dissipation element is realized on the side of the cover.

FIG. 7 shows a lower portion of a seventh exemplary embodiment. This can replace the lower portion in any of the above-described exemplary embodiments. The configuration is mainly identical to the one described for the sixth exemplary embodiment. However, the gas dissipation element 6 has an active portion 6a and a passive portion 6b.

The active portion 6a is realized in the first through hole portion 5a and has its dimensions, but continues through the entire thickness of the gas dissipation element 6. The passive portion 6b is established above the horizontal surface of the recess-like second through hole portion 6b. The passive portion 6b is chemisorbed to said horizontal surfaces. Furthermore, the passive portion 6b provides the mechanical connection that holds the active portion 6a in place. Generally the active portion and the passive portion can consist of the same material and their function may be defined by the arrangement of the portions in the described portions of the through hole 5.

Alternatively the active portion 6a and the passive portion 6b can be made of different materials. In such a case the active portion can consist of Si. The passive portion 6b can consist of a silicone resin. Other preferred materials can be acrylate resin, urethane resin, synthetic rubbers, natural rubbers, latex, fluorinated polymers. In this case the passive portion 6b can be fixed to the case 3 by vulcanization, overmolding or chemical bonding. The active portion can be glued into the passive portion with a polymer glue.

Figure 8:
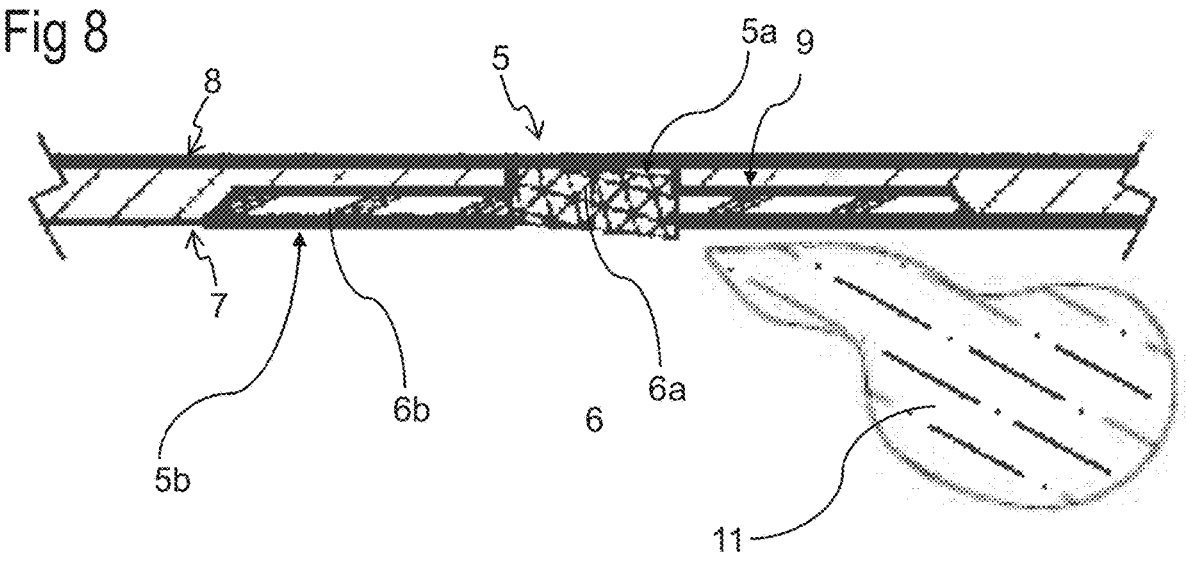
FIG. 8 shows a schematic cross-section of an emergency vent action of the seventh exemplary embodiment of a capacitor.

FIG. 8 shows a schematic cross-section of an emergency vent action of the seventh exemplary embodiment of a capacitor. The connection between the passive portion 6b and the active portion 6a can be comparatively weak and designed such that it holds up to normal non-critical pressure buildup that is formed by slow gas formation. Such slow gas formation can be compensated by non-destructive gas release-function of the gas dissipation element. However, in the case of a huge amount of gas suddenly building up inside the housing, the gas may not be able to leave through the gas dissipation element fast enough via diffusion or permeation, and dangerous pressure can build up. In this case the connection between the active portion 6a and the passive portion 6b can be designed such that it ruptures, and an irreversible emergency venting can take place as indicated by the gas plume 11. Thus the capacitor is destroyed, but other components or humans may be protected.

Figure 9:
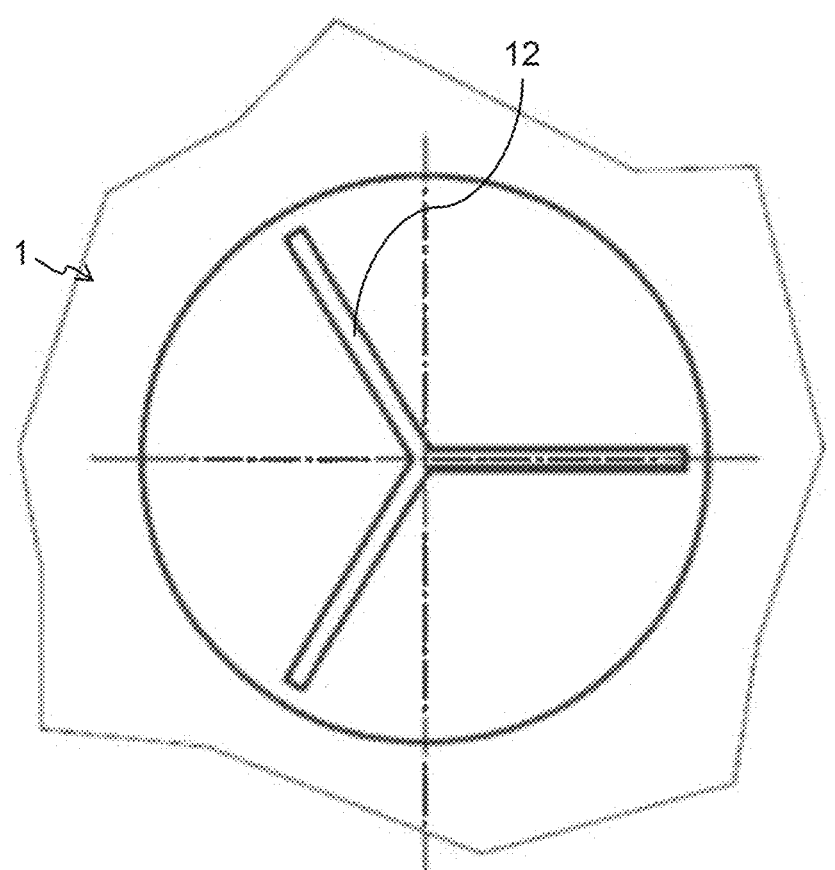
FIG. 9 shows a top view of a separate emergency vent for a capacitor.
Figure 10:
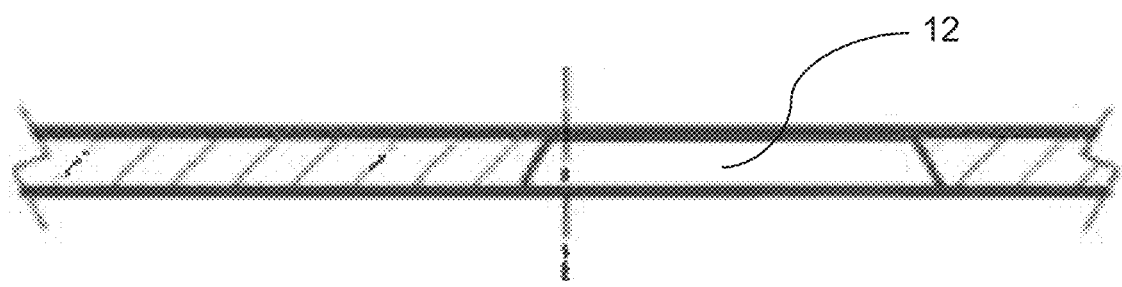
FIG. 10 shows a schematic cross-section of the separate emergency vent for a capacitor shown in FIG. 9.
Figure 11:
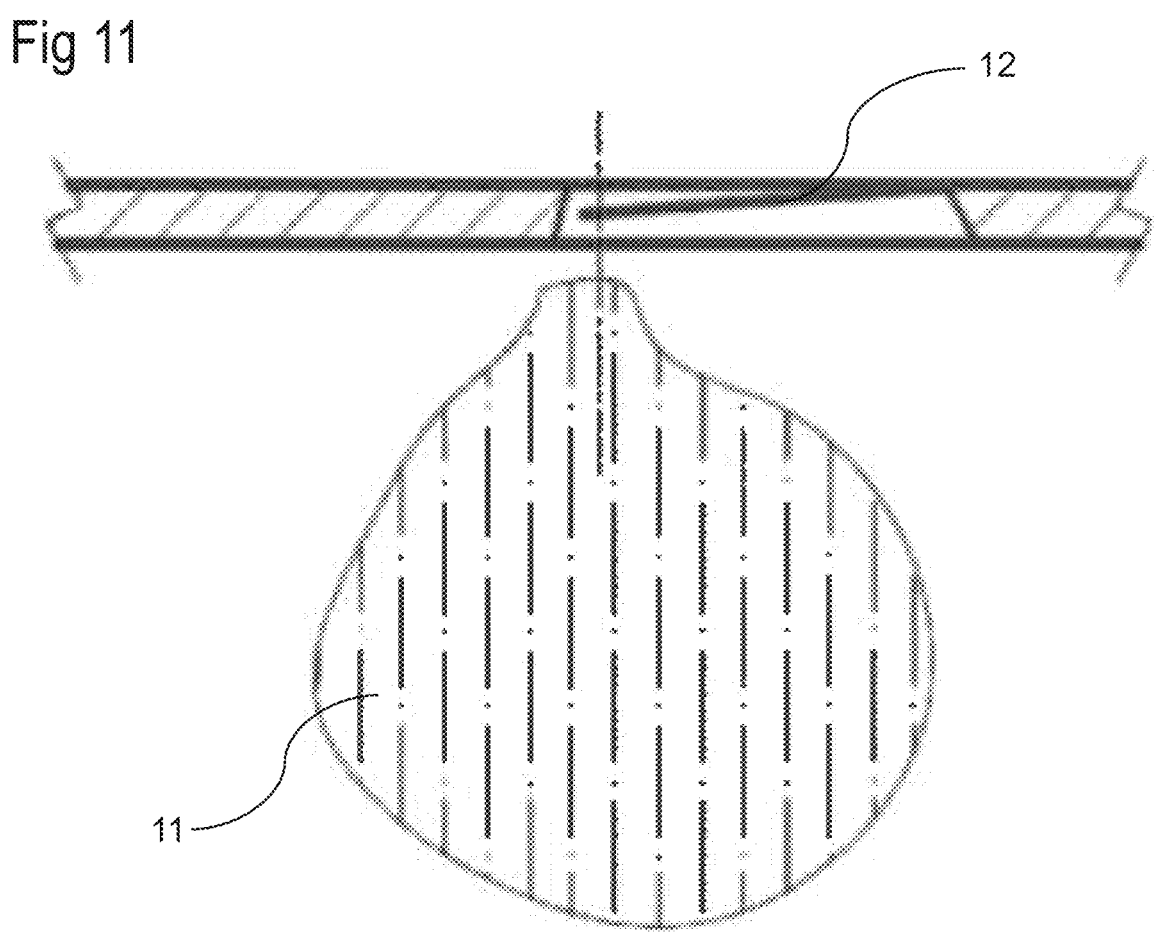
FIG. 11 shows a schematic cross-section of an emergency vent action of the separate emergency vent for a capacitor shown in FIGS. 9 and 10.

In FIGS. 9 to 11 a separate emergency gas release vent 12 is shown. It can be realized as a thinned out area in the housing. This vent can be established in addition to a setup according to FIGS. 7 and 8. However more preferably the setup according to FIGS. 7 and 8 can help to reduce the need for the additional emergency gas release vent 12. As can be seen in FIG. 11, also the additional emergency gas release vent 12 can be designed to release suddenly built-up pressure in a destructive manner, as indicated by the ruptured valve and the gas plume 11.

REFERENCES

1 capacitor
2 capacitive element
3 casing
4 cover 5 through hole
5a first through hole portion
5b second through hole portion
6 gas dissipation element
6a active portion
6b passive portion
7 outer surface
8 inner surface
10 electrically conductive element
11 gas plume
12 separate emergency gas release vent
D thickness
TD total thickness The ivnention claimed is:

1. A capacitor comprising:
a capacitive element arranged in a housing, wherein
    the capacitive element has an anode that comprises a
        sintered valve metal,
        a fraction of volume occupied by the anode with
            respect to a total volume inside the housing is 20%
            or higher,
        at least a portion of the capacitive element is soaked
            with or immersed in an electrolyte, said electrolyte
            comprises an at least dicarboxylic acid having a
            pKai of 4.1 or higher, and the concentration of the
            at least dicarboxylic acid is 0.1 wt % or higher,
    in the housing a gas dissipation element is arranged that
        is configured for reducing a gas pressure inside the
        capacitor,
        wherein a contact surface of the housing comprises
            a surface structuring that is configured to improve
            a bonding between a portion of the gas dissipation
            element that is in contact with the contact surface
            and said contact surface, and
        wherein the gas dissipation element is chemisorbed
            onto the housing, and
        a portion of silicon in the gas dissipation element or
            in an active portion of the gas dissipation element
            is 5 wt % or higher.

2. The capacitor according to claim 1, wherein the valve
metal is or comprises Al.

3. The capacitor according to claim 1, wherein an average
thickness of the anode is at least 80 μm.

4. A capacitor comprising:
a capacitive element arranged in a housing, wherein
    in or on the housing a gas dissipation element config-
        ured for reducing a gas pressure inside the capacitor
        is arranged,
        wherein a portion of silicon in the gas dissipation
            element or in an active portion of the gas dissi-
            pation element is 5 wt % or higher,
        wherein the gas dissipation element is arranged in or
            on the housing in such a manner that a contact
            surface of the housing comprises a surface struc-
            turing that is configured to improve a bonding
            between a portion of the gas dissipation element
            that is in contact with the contact surface and said
            contact surface, and wherein the gas dissipation element is chemisorbed
    onto the housing.

5. The capacitor according to claim 4, wherein the gas
dissipation element has an active portion configured for
reducing the gas pressure inside the capacitor and a passive
portion that provides a mechanical connection between the
housing and the active portion.

6. The capacitor according to claim 4, wherein an active
volume of the gas dissipation element or the volume of an
active portion of the gas dissipation element is 0.05 mm³ or
higher.

7. The capacitor according to claim 5, wherein the active
portion of the gas dissipation element has a cylindrical form.

8. The capacitor according to claim 5, wherein the active
portion of the gas dissipation element is configured to
irreversibly rupture or irreversibly disconnect from the pas-
sive portion upon a pressure increase which cannot be
compensated by the non-destructive pressure reduction
capabilities of the gas dissipation element.

9. The capacitor according to claim 4, wherein at least a
portion of the capacitive element is soaked with or immersed
in an electrolyte, and the electrolyte comprises an organic
acid having a pKa of 4.1 or higher.

10. The capacitor according to claim 9, wherein the
organic acid is an at least dicarboxylic acid having a pKai of
4.1 or higher.

11. The capacitor according to claim 9, wherein the
concentration of the organic acid is at least 0.1 wt %.

12. The capacitor according to claim 9, wherein a main
component of the electrolyte is a polyol.

13. The capacitor according to claim 4, wherein the
capacitive element has an anode that comprises a sintered
valve metal.

14. A method for producing a capacitor, comprising:
providing a housing having a through hole or first open-
    ing, wherein the housing comprises a casing and a
    cover,
arranging in or on the through hole or first opening a gas
    dissipation element that is configured to reduce a gas
    pressure inside the capacitor, wherein the gas dissipa-
    tion element is chemisorbed onto a contact surface of
    the housing, and wherein the contact surface of the
    housing comprises a surface structuring that is config-
    ured to improve a bonding between the housing and the
    gas dissipation element, and
arranging a capacitive element having and anode that
    comprises a sintered valve metal in the casing, and
impregnating with or soaking the capacitive element in an
    electrolyte,
enclosing the capacitive element in the housing by placing
    the cover on a cover-opening in the casing.

15. The method of claim 14, wherein the impregnating
with or soaking the capacitive element in the electrolyte is
performed before the arranging the capacitive element in the
housing.

* * * * *